United States Patent [19]

Shutt et al.

[11] 4,016,131

[45] Apr. 5, 1977

[54] PREPARATION OF UNSATURATED POLYESTER COMPOSITIONS

[75] Inventors: Thomas Clifford Shutt, Arvada; L. Wayne Snider, Denver, both of Colo.

[73] Assignee: Vitrofil Corporation, Denver, Colo.

[22] Filed: Apr. 4, 1975

[21] Appl. No.: 565,238

[52] U.S. Cl. ............................. 260/40 R; 106/52; 260/865

[51] Int. Cl.² ................................. C08K 3/40

[58] Field of Search ....... 106/52; 260/40 R, 45.7 R, 260/45.75 B, 865

[56] References Cited

UNITED STATES PATENTS

| | | | |
|---|---|---|---|
| 2,182,384 | 12/1939 | McGregor | 106/52 X |
| 3,077,424 | 2/1963 | Maker et al. | 260/40 R X |
| 3,227,665 | 1/1966 | Fourcode et al. | 260/40 R X |
| 3,269,847 | 8/1966 | Cohen | 260/40 R X |
| 3,538,188 | 11/1970 | Fekete et al. | 260/865 |
| 3,539,479 | 11/1970 | Alberts | 260/865 |
| 3,600,205 | 8/1971 | Breton | 106/52 X |
| 3,692,736 | 9/1972 | Besnard et al. | 260/40 R |
| 3,846,366 | 11/1974 | Wallace | 260/40 R X |

OTHER PUBLICATIONS

*Chemical Abstracts,* por. 82:4884g.
S. Oleesky et al., *Handbook of Reinforced Plastics,* (1964), pp. 199 and 235.

*Primary Examiner*—Donald E. Czaja
*Assistant Examiner*—S. M. Person
*Attorney, Agent, or Firm*—Arthur A. March

[57] ABSTRACT

Admixture of unsaturated polyester and finely ground powder particles of soda-containing silicate glass, preferably soda-lime-silicate glass, e.g. below about 40 mesh and in an amount of between about 1 to 60% based on the weight of the polyester-glass particle admixture, providing improved properties in the ultimately cured resin at lower material costs and having special application as a composition for use in fabricating fibrous glass (i.e. fiber-glass) reinforced plastics composite products.

18 Claims, No Drawings

PREPARATION OF UNSATURATED POLYESTER COMPOSITIONS

The present invention relates to and has among its objects the provision of compositions containing an admixture of unsaturated polyester and finely ground particles of soda-containing glass, and preferably soda-lime-silicate glass, which impart improved properties to the ultimately cured resin and simultaneously serve to reduce the overall material costs.

Unsaturated polyesters are commonly used today as bulk raw materials together with glass fibers or fibrous glass (for convenience hereinafter termed "fiberglass") to form composite structures generally referred to in the art as fiber-glass reinforced plastics (FRP). Inert fillers or extenders are often included in such compositions to reduce the overall material costs. The FRP industry is concerned with the fabrication of a wide range of composite products, for example, shaped articles such as boat hulls and other parts, bath and shower modules, storage tanks, etc.

The generic term "unsaturated polyester" (or polyester alkyd) is a convenient designation used in the art to describe many very similar organic resinous chemicals usable as such bulk raw materials in the FRP industry. Unsaturated polyesters chemically comprise a class of soluble, linear, low molecular weight macromolecules which contain both carboxylic ester groups and carbon-carbon double bonds as recurring units along the corresponding main chain. A typical such unsaturated polyester widely used in the FRP industry is the general purpose polyester (GPP) which has, after reaction has occurred, i.e. polymerization or curing, the following recurring unit linear molecular structure:

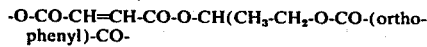

I.

During 1973, approximately 450,000 tons of unsaturated polyesters were used for the manufacture of FRP items. In connection with such manufacture, when the two basic raw materials employed, i.e. unsaturated polyester and fiber-glass, are mixed together, usually in the proportion of polyester to fiber-glass of about 65–70:35–30 parts by weight, they form a strong, inert material or composition product upon curing. Such curing is usually carried out by adding to the mixture a conventional curing catalyst for unsaturated polyester such as an organic peroxide. FRP systems combine the superior chemical properties of the generally linear polyester resins with the superior physical or mechanical reinforcing properties of fiber-glass. As a consequence, the relatively physically or mechanically weak polyester, which has good chemical corrosion and water resistance properties, is made considerably stronger by the addition of fiber-glass, for instance in a reinforcing amount of approximately 30 to 35% of the mixture.

For many applications a general purpose polyester, such as that noted above, will suffice. However, there are numerous applications in which a more specialized polyester must be used. Such will be the case, for example, where higher resistance to chemical corrosion or to water is needed or where greater fire retardation properties are required. In order to achieve such improved properties in the system, either an isophthalic polyester or a bisphenol fumarate polyester may be typically employed.

The corresponding recurring unit linear molecular structures for these specialized polyesters respectively are as follows:

Isophthalic Polyester

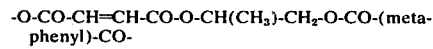

II.

Bisphenol Fumarate Polyester

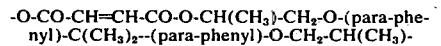

III.

It should be noted that the improved chemical properties attained with the use of such isophthalic and bisphenol fumarate polyesters are generally attributed to the fact that, for a given recurring unit molecular length, there are fewer carboxylic ester linkages (-CO-O-) than in the general purpose polyester (cf. formulae II and III with formula I). It is well known in the art that the ester linkage is generally the weakest part of the polyester chain in that it is relatively easily hydrolyzed. Therefore, generally as the number of such ester linkages increases the desired chemical properties will decrease in the cured resin.

Added resistance to heat or fire can be supplied to these polyester resins by the introduction of various flame-retardant materials. Most common among these substances is antimony trioxide ($Sb_2O_3$), which is usually included in an amount representing about 5% based on the weight of the polyester resin.

Alternatively, there are also available certain non-polyester resins which inherently possess extreme resistance to heat without the need for incorporating additives such as antimony trioxide to achieve this enhanced effect. Such non-polyester resins generally comprise silicones or organosilicon type resins. The apparent reason for their inherent heat resistance is that these organosilicon type resins incorporate a very strong, inert bond, i.e. the Si-O bond, which forms the basic framework of the polymer. This stability seems to occur because of the very high heat of formation ($\Delta H_f$) of the substance in question. This point may be illustrated by Table 1 below which compares the heat of formation values for various pertinent substances:

TABLE 1

| Substance | ΔHc Kcal/mol | Melting Point ° C |
|---|---|---|
| $Al_2O_3$ | −390 | 2050 |
| $SiO_2$ | −198 | 1710 |
| CaO | −151 | 2580 |
| $Na_2O$ | −121 | sublimes (1275) |
| $CH_4$ | −18 | −184 |
| $C_2H_6$ | −29 | −172 |

Thus, the incorporation of inorganic bonds into polymer systems would seen to provide a means for increasing thermal stability since the heats of formation for the pertinent inorganic substances far exceed, even in order of magnitude, those for organic substances such as methane and ethane.

In this regard, in the past various inert inorganic substances such as aluminum trihydrate ($Al_2O_3.3H_2O$), silica, and diatomaceous earth have been incorporated in polyester resin systems as fillers, extenders or additives. However, these have been added primarily as a means of lowering the overall cost of the basic raw materials by substituting the lower cost extender for a part of the higher cost resin. In actuality, it has been found that the inclusion of such fillers or extenders reduces the quality of the finished product because they lower or detract from the desired chemical and physical properties otherwise normally attained in the polyester resin system. These fillers or extenders apparently exist only as physically incorporated components in the resin system and do not seem to react with any functional groups of the resin to incorporate chemically any inorganic bonds into the polymer system to any discernible extent.

In accordance with the present invention, it has been found, in contrast thereto, that additions of very finely ground inexpensive soda-containing silicate glass, and particularly soda-lime-silicate glass, to unsaturated polyester systems, in amounts for instance of between about 1 to 60%, and preferably 40—50%, based on the total weight of the polyester and glass particles present, impart improved physical and chemical properties to the ultimately cured resin.

Advantageously, therefore, the present invention not only provides a particular inexpensive and readily available physical extender component which serves to reduce the overall raw materials cost of the system but also provides simultaneously a true chemical additive component which leads to a final cured composite product of improved chemical and physical properties.

More specifically, the present invention contemplates compositions comprising an intimate admixture of unsaturated polyester and finely ground powder particles of soda-containing silicate glass, e.g. soda-lime-silicate glass, preferably in which the particles of glass have an average particle size below about 40 mesh (i.e. below about 0.42 mm.), and particularly below about 325 mesh (i.e. below abut 0.044 mm.), and also preferably in which the particles of glass are present in an amount of between about 1 to 60%, especially between about 30 to 60% or 40 to 60%, and particularly between about 40 to 50%, based on the total weight of the polyester-glass particle admixture. In corresponding curable compositions, both with and without the inclusion of fiber-glass combined therewith, are contemplated by the invention.

In this regard, the present invention also particularly concerns fiber-glass reinforced plastics (FRP) compositions comprising in corresponding cured resin condition a composite structure of fiber-glass combined with such an intimate admixture of unsaturated polyester and finely ground soda-containing silicate glass particles. The fiber-glass may be impregnated or otherwise mixed, wetted, or combined with the instant polyester/glass admixture composition in the conventional manner to form upon curing of the resin an appropriate, selectively shaped, product or article of fiber-glass reinforced polyester. The cured polyester resin in effect constitutes the basic matrix for the composite product.

The present invention also embraces the attendant method of curing such intimate admixture or combination to form the corresponding cured polyester resin matrix composite product as described herein.

The finely ground glass particle component of the composite system of the present invention may be, for example, composed of powder particles of any soda-containing silicate glass, especially soda-lime-silicate glass, new or used, or any mixtures thereof, including glass particles from any original or recycled source, e.g. bottles, window panes, jars, etc. The glass must contain a source of readily available sodium ions and preferably should also contain a source of calcium ions.

While the present invention broadly contemplates the inclusion of sodium-containing borosilicate type glass, for example, as an ingredient, since this type of glass which has a comparatively low available sodium content, does not appear to be optimally operative to give the more outstanding improved results according to the invention which are generally obtained with soda-lime-silicate glass, as based upon information to date, soda-lime-silicate glass is the presently preferred and most suitable type glass contemplated herein, and will be used in preference over borosilicate glass.

The glass intended for inclusion as active extender component according to the invention must be washed clean if necessary and dried before use. The clean glass is then crushed and milled, as appropriate, in the conventional manner, preferably in the absence of moisture, to produce a very finely ground powder of inherently high and irregular surface area. This product is screened to obtain the desired average particle size fraction. If not immediately used, the finely milled and screened glass powder is desirably maintained in the presence of a suitable desiccant, such as silica gel, so that it cannot be attacked by moisture. In any case, the ground particles of glass should be in substantially dry condition when used since the presence of moisture is generally considered detrimental to the basic system. This is perhaps due to the fact that, other things being equal, moisture promotes hydrolysis of the carboxylic ester groups in the polyester resin during resin curing which leads to the weakening of the entire structure.

The polyester component of the instant admixture may be any conventional unsaturated polyester. Such unsaturated polyesters, as aforesaid, are all soluble, linear, low molecular weight macro-molecules which contain both carboxylic ester groups and carbon-carbon double bonds as recurring units along the main chain. They contemplate, for example, unsaturated polyesters or polyester curable resins which contain polybasic unsaturated acid (e.g. unsaturated dicarboxylic acid) and alkyd (e.g. polybasic acid or anhydride-polyhydric alcohol condensate) recurring units or linkages such as fumarate and glyptal (e.g. glycerol-phthalic acid condensate) units or linkages. They also contemplate those which contain polybasic unsaturated acid (e.g. unsaturated dicarboxylic acid) and bisphenol-alkylene ether recurring units or linkages such as fumarate and bisphenol-propylene ether units or linkages. In particular, such unsaturated polyesters include the general purpose polyester (GPP) of the formula I type and any specialized polyester of the formula II or formula III type.

Of course, any known or conventional type fibrous glass or glass fiber material may be used as the fiber-glass component for mechanically or physically reinforcing the ultimate composition in the desired manner. Such fiber-glass material may constitute, for instance, glass fibers generally ranging in diameter from about 0.0004 to 0.012 inch. Generally, they are flexible yet of relatively high tensile strength, non-flammable, and not normally affected by moisture or by most acids. They may be used in roving, chopped strand mat, fabric or other conventional form for impregnation by or mixing or combining with the polyester/active glass extender admixture of the invention to achieve appropriate fiber-glass reinforced plastic products as articles of any desired shape and type. Such glass fibers or fiber-glass, generally only contribute strength and stiffness in the direction of their length to the finished article.

The proportion of polyester to fiber-glass used according to the invention is conventional. Suitably, for instance, a weight ratio range of about 50 to 90% of polyester to about 50 to 10% of fiber-glass may be empolyed, depending on the purpose of the application. Naturally, other things being equal, the inherent properties of the cured polyester resin component in the system will depend upon the corresponding precursor properties in the particular starting unsaturated polyester selected.

The particles of glass in the desired amount and in substantially dry condition are intimately admixed with the normally liquid unsaturated polyester, preferably under shearing force, as by intense stirring, to achieve a uniform dispersion in which the finely ground glass particles are evenly distributed throughout and intimately wetted with the precursor resin matrix. A curing agent or catalyst such as methyl ethyl ketone peroxide is then added in the conventional manner. The admixture is allowed to cure as is, or if it is to be fiber-glass reinforced, the admixture and fiber-glass are combined before resin curing has set in.

In this regard, the four major methods of FRP fabrication, namely, lay-up (hand or spray gun), filiment winding, casting and molding, may all employ the polyester/finely ground glass admixture according to the invention. The instant admixture or composition is handled in exactly the same way that the resin without the active extender component of the invention would be handled, i.e. in applying the same to the fiber-glass.

An average particle size of below about 325 mesh (i.e. below about 0.044 mm.) is generally the most commonly employed glass fraction size. This is because, in laying up most FRP items, a spray gun is used which necessitates in turn the use of a finely divided extender. In fact, the spray gun apparatus is usually designed to admix the curing catalyst into the resin/extender mixture so that the gun nozzle assembly supplies a curable condition mix to the fiber-glass. The fiber-glass is often supplied as chopped lengths from a continuous strand at the gun nozzle vicinity so as to be wetted, impregnated and/or combined with the resin-/extender/catalyst mix by this lay-up technique.

Nevertheless, in the other methods of lay-up, much coarser glass particle sizes may be employed. In particular, it has been found, for example, that glass material of below about 40 mesh (i.e. below about 0.44 mm.) average particle size is especially applicable in hand-lay-up work. Of course, depending upon the results sought other coarser or finer particle sizes may also be employed. An intermediate average particle size of below about 200 mesh (i.e. below about 0.074 mm.), for instance, is suitable for many applications.

Understandably, the properties that result from the inclusion of the finely ground glass in the instant admixtures will vary with the type of resin utilized, the amount of glass particles based on the resin content, the average particle size of such glass, the proportion of resin to fiber-glass in the system, and the like. However, one specific property or factor which is greatly improved by the presence of the finely ground glass as an active extender according to the invention concerns the "roll-out" time of the finished FRP unit being produced. This roll-out time is the time taken manually to smooth out the workpiece, remove all air bubbles, etc. When using the instant compositions or admixtures, such roll-out time is reduced by about 30 to 60% as compared with that for the normal polyester or polyester/conventional extender systems heretofore used.

The following examples are set forth by way of illustration and not limitation.

EXAMPLE a. Soda-lime-silicate glass from any source (bottles, window panes, jars, etc.) is washed clean, then dried, crushed and milled in conventional manner to obtain predominantly particles having a particle size below about 325 mesh. The resulting powder is screened on a U.S.S. 325 mesh screen and the glass powder particles that pass through the screen (i.e. the minus 325 mesh fraction) are collected and bagged with silica gel as desiccant to prevent moisture contamination. This fraction having an average particle size below about 325 mesh is used as the finely ground soda-lime-silicate glass extender or component to be admixed with the unsaturated polyester or resin component.

b. To produce a corresponding cured FRP product, a portion of the collected fraction from (a) is added in an appropriate pre-weighed amount to a pre-weighed quantity of liquid unsaturated polyester (general purpose polyester of formula I type:"Cook" orthophthalic unsaturated polyester, Cook Paint & Varnish Co.) The resulting mixture is stirred for about 30 minutes to effect thorough and intimate mixing under the shearing force of the impeller blade of the stirrer. A uniform dispersion is produced in which the finely ground particles are evenly distributed throughout the polyester mass. The stirring of this intimate mixture is continued gently to prevent settling of the glass particles. This polyester/glass admixture is then combined with 2% methyl ethyl ketone peroxide as curing catalyst and a reinforcing amount of fiber-glass in the weight ratio of polyester-glass admixture to fiber-glass of 65:35. The resulting composite is cured in the conventional manner at 70°–75° F for about 24 hours. Cured products in plate form are separately produced according to this procedure from corresponding admixtures of unsaturated polyester and glass containing respectively 40%, 50% and 60% by weight glass particles based on the total weight of the polyester-glass particle admixture. A comparison cured plate product is also produced in exactly the same way using in place of the glass particles 30% by weight of conventional aluminum trihydrate based on total weight of the polyester-aluminum trihydrate admixture.

Sample plates are formed from the corresponding cured combinations and the results of certain tests regarding their properties are set forth in Table 2 below:

TABLE 2

| | Properties of Polyester/Extender Systems | | | | |
| --- | --- | --- | --- | --- | --- |
| | (65:35 weight ratio of polyester/extender to fiber glass) | | | | |
| Material | GPP | GPP + A[(1)] | GPP + G | GPP + G | GPP + G[(1)] |
| % Extender | 0 | 30 | 40 | 50 | 60 |
| System Cost /lb. | 55[(2)] | 41.35 | 36 | 31.25 | 26.5 |

TABLE 2-continued

Properties of Polyester/Extender Systems

| Material | (65:35 weight ratio of polyester/extender to fiber glass) | | | | |
|---|---|---|---|---|---|
| | GPP | GPP + A[(1)] | GPP + G | GPP + G | GPP + G[(1)] |
| System Cost as % of GPP | 100% | 75% | 65% | 57% | 48% |
| Tensile Str. psi | 6472 | 5920 | 7478 | 8338 | 6342 |
| Tensile Str. as % of GPP | 100% | 92% | 115% | 129% | 98% |
| Flexural Mod. psi × 10[6] | 1.099 | 0.672 | 1.096 | 1.076 | 0.754 |
| Flexural Mod. as % of GPP | 100% | 61% | 100% | 98% | 69% |
| Burn Rate in./min. | 1.21 | 0.94 | 0.99 | 0.76 | 0.85 |
| Burn Rate as % of GPP | 100% | 78% | 82% | 63% | 70% |
| % Water Absorption | 1.3 | 0.67 | — | 0.20 | — |

GPP = General Purpose Polyester
A = Aluminum Trihydrate (extender)
G = −325 mesh glass (extender of invention)
(1) = Maximum corresponding extender addition possible for a spray gun lay-up
(2) = Average cost - varies slightly Although the invention results in Table 2 cover general purpose polyester/active glass extender mixtures only, they serve to illustrate the basic improvements in properties imparted by the use of the instant glass component as extender for any appropriate unsaturated polyester system. They especially reflect the corresponding general enhancement in properties achievable simultaneously with overall reduction in material costs in fiber-glass reinforced plastics systems using the same.

It is not fully understood at this time why the instant finely ground particles of soda-containing silicate glass, especially soda-lime-silicate glass, markedly improve the properties of FRP systems whereas other extenders of the conventional type such as aluminum trihydrate reduce or detract from such properties. However, it is believed that the reason for the difference, at least in some significant measure, is because of the abundant available supply of vicinally immediate surfae oriented sodium ions present at active sites in the inherently high surface area of the finely ground (and inherently irregularly fractured) particles of glass used according to the invention which are liberated into the unsaturated polyester. As they become available, these sodium ions are active and are believed to dissolve into and react with the resin during curing to rupture the C=O ester carbonyl oxygen and C=C ethylenic unsaturation linkages in the unsaturated polyester.

According to this theory, such rupture in the case of a general purpose polyester of the formula I type would lead in the extreme to the following recurring unit linear molecular structure:

bond disassociation energy at 25° C for the Na-O bond is 61 Kcal/mol, which is close to the strength of the H-C bond at 80 Kcal/mol and considerably stronger than the C=O bond.

In particular, such bonding of the Na[+]ions at active glass surface sites with active functional carbon atoms in the polyester chain, would explain the results obtained in Table 2 above. In this regard, the reason for the decline in enhanced properties (cf. Tensile Strength and Flexural Modulus of Elasticity values) of the resin/active extender composition of the invention at 60% loading (i.e. 60% glass extender based on the resin-glass admixture weight) would appear to be purely physical; to wit, the loading is too high to get good wetting and bonding and to permit sufficient resin to take part in the overall curing reaction for optimum possible results. Clearly, a minimum effective amount of the resin must be present in the extended system to take advantage of the inherent properties of the resin.

Necessarily, this three component system (fiber-glass/resin/glass particle) will always produce results that represent some inherent compromise among the individual properties of the respective components. Thus, at higher glass extender loading undersirably high viscosity and density characteristics will be imparted which, for instance, in the case of a "spray-up" mix often will lead to products of poorer quality, e.g. air holes, poor wetting, etc. and hence reduced physical and chemical properties. Therefore, appropriate proportional adjustments will be made depending upon the results sought.

On the other hand, with aluminum trihydrate as ex-

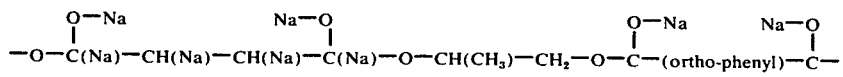

(IV)

It is highly unlikely that such complete and perfect sodium bond linkage addition would occur. Nevertheless, the existence of some of these sodium ion-containing linkages would plausibly explain the enhanced properties of the resulting resin/active extender admixture compositions of the invention. For example, the tender, it is believed that the OH[−] radical present in the extender hydrolyzes the polyester, causing weakening of the entire structure. Despite the drop in values for the desired properties at 30% loading, however, the corresponding cost savings have been heretofore considered sufficient to merit use of aluminum trihydrate as such an extender. The comparatively good Burn Rate performance of the aluminum trihydrate extended system at 30% loading, on the other hand, is readily attributable to the presence of potential water molecules which inherently impart improved flame retardant properties (cf. the representative differences in water absorption in Table 2.). Nevertheless, as is known, loadings in excess of about 30% aluminum trihydrate lead to unacceptable results. At such loadings the desired properties decline drastically.

It is also probable that where calcium ions are present in the fine glass particles of the active extender of the invention, such as in the case of the preferred soda-lime-silicate glass, these calcium ions ($Ca^{++}$) will be liberated into the resin in the same way as the abundancy of sodium ions, and as they become available, will dissolve into and react with the resin during curing to rupture appropriate C=O ester carbonyl oxygen linkages, and perhaps even C=C ethylenic unsaturation linkages, in the unsaturated polyester. According to this probable phenomenon, which of course is not fully understood as aforesaid, the presence of calcium ions could aid in cross-linking of the resin by interbonding with C=O oxygen linkages, and possibly also with C=C unsaturation linkages, on corresponding polyester claims, as suggested by the following schemes:

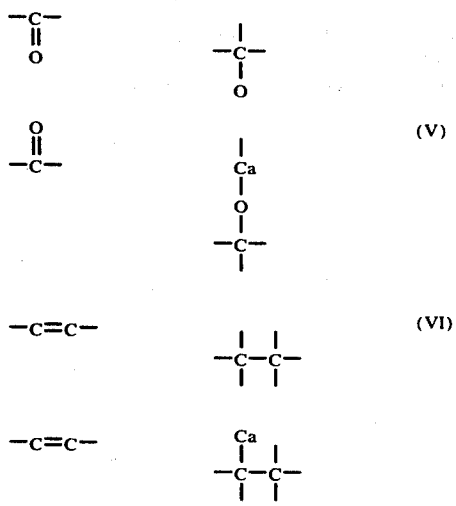

Such suggested mechanisms in schemes (V) and (VI) may involve as well the appropriate co-addition of sodium ions similar to the suggested concept in formula IV to provide a complex type sodium and calcium ion-containing cured polyester resin, perhaps with random cross-linking and partial sodium and calcium bonding arrangements associated in essentially vicinally immediate in situ surface contact with the precursor finely divided and ground powder particles of glass in the resin matrix system.

In this regard, as indicated above, while borosilicate glass can also be used broadly as an ingredient for the sodium-containing or soda-containing silicate glass component according to the invention, it is presently not the most preferred type. This is because its effect would not appear to be pronounced in the manner of soda-lime-silicate glass. This is consistent with the above postulated explanation in that the lower available sodium ion content ($Na^+$) of borosilicate glass lessens its effect upon attendent C=O ester carbonyl oxygen and C=C ethylenic unsaturation linkages as compared with that in the case of soda-lime-silicate glass having an abundant available sodium ion content.

Although the specific phenomenon of alkali and alkaline earth dissolution from glass is itself a well known concept as concerns glass surfaces, this has not been considered heretofore as pertinent in connection with FRP systems using curable unsaturated polyesters in the context of the invention. As is known, relatively large hollow glass spheres have been used heretofore as conventional extenders. However, these spheres always predictably reduce or detract from the properties of FRP systems. In contrast thereto, the systems according to the invention surprisingly possess improved properties. This might be explained by the fact that such large size glass spheres lack the necessary available abundant supply of vicinally immediate surface oriented sodium ions at active sites as provided in the inherently high surface area finely ground and irregularly fractured powder particles of glass used as active extender in accordance with the present invention. This may be coupled with the heretofore unrecognized fact that such sodium ions in such finely sized powder particles apparently play a significant precursor role in attaining cured fiber-glass reinforced unsaturated polyester resin systems of improved properties despite the original existence of unfavorably regarded ester and double bond linkages as aforesaid.

It will thus be seen from the above that among the objects and advantages of the present invention is the provision of FRP compositions and systems of improved properties, readily produced from inexpensive and widely available soda-silicate glass as active extender component, together with unsaturated polyester as resin component and fibrous glass or glass fiber as reinforcing component.

It will be appreciated that the instant specification and examples are set forth by way of illustration and not limitation, and that various modifications and changes may be made without departing from the spirit and scope of the present invention which is to be limited solely by the scope of the appended claims.

What is claimed is:

1. Composition for fiber-glass reinforced plastic products comprising an admixture of unsaturated polyester and substantially pre-cleaned, dry and moisture-protected, fractured, active, finely ground powder particles of soda-containing silicate glass having a high and irregular surface area, an average particle size below about 40 mesh and an active cured polyester structurally reinforcing property.

2. Compositon according to claim 1 wherein said particles of glass are soda-lime silicate glass and are present in an amount of between about 1 to 60% based on the weight of the polyester -glass particle admixture.

3. Composition according to claim 2 wherein said particles of glass are present in an amount of between about 40 to 50% based on the weight of the polyester-glass particle admixture.

4. Composition according to claim 1 wherein said particles of glass are soda-lime-silicate glass.

5. Composition according to claim 4 wherein said particles of glass have an average particle size below about 325 mesh.

6. Composition according to claim 1 wherein said intimate admixture is combined with fiber-glass.

7. Composition according to claim 4 comprising an intimate admixture in the form of a substantially uniform dispersion of unsaturated polyester having carboxylic ester groups and carbon-carbon double bonds as recurring units along the main chains of the corresponding macromolecules thereof and said finely ground powder particles of soda-lime-silicate glass having an average particle size below about 40 mesh and present in an amount of between about 1 to 60% based on the weight of the polyester-glass particle admixture.

8. Composition according to claim 7 wherein said particles of glass have an average particle size below about 325 mesh and are present in an amount of between about 40 to 50% based on the weight of the polyester-glass particle admixture.

9. Composition according to claim 7 wherein said intimate admixture is combined with fiber-glass.

10. Composition according to claim 6 wherein said composition is in corresponding cured resin condition.

11. Composition according to claim 9 wherein said composition is in corresponding cured resin condition.

12. Composition according to claim 4 comprising in corresponding cured resin condition a composite structure of fiber-glass combined with an intimate admixture of unsaturated polyester and said finely ground powder particles of soda-lime-silicate glass, in which said polyester and fiber-glass are present in the weight ratio range of about 50 to 90% polyester to about 50 to 10% fiber-glass and said particles of glass are present in an amount of between about 1 to 60% based on the weight of the polyester-glass particle admixture.

13. Composition according to claim 12 wherein said particles of glass are present in an amount of between about 40 to 50% based on the weight of the polyester-glass particle admixture.

14. Composition according to claim 12 wherein said particles of glass have an average particle size below about 325 mesh.

15. Composition according to claim 12 wherein said particles of glass have an average particle size below about 325 mesh and are present in an amount of between about 40 to 50% based on the weight of the polyester-glass particle admixture.

16. Composition according to claim 12 comprising in corresponding cured resin condition a composite structure of fiber-glass combined with an intimate admixture in the form of a substantially uniform dispersion of unsaturated polyester having carboxylic ester groups and carbon-carbon double bonds as recurring units along the main chains of the corresponding macromolecules thereof and said finely ground powder particles of soda-lime-silicate glass, in which said polyester and fiber-glass are present in the weight ratio range of about 50 to 90% polyester resin to about 50 to 10% fiber-glass and said particles of glass have an average particle size below about 40 mesh and are present in an amount of between about 1 to 60% based on the weight of the polyester-glass particle admixture.

17. Method which comprises curing the admixture combination according to claim 6 to form a corresponding cured polyester resin composite product.

18. Method which comprises curing the admixture combination according to claim 9 to form a corresponding cured polyester resin composite product.

* * * * *